United States Patent [19]

Bickl et al.

[11] 4,099,862
[45] Jul. 11, 1978

[54] METHOD AND APPARATUS FOR EVALUATING DEVELOPED PHOTOGRAPHIC FILMS PREPARATORY TO REPRODUCTION

[75] Inventors: Horst Bickl, Pullach; Günter Findeis, Sauerlach; Helmut Treiber; Wolfgang Zahn, both of Munich, all of Fed. Rep. of Germany

[73] Assignee: Agfa-Gevaert AG, Leverkusen, Fed. Rep. of Germany

[21] Appl. No.: 739,547

[22] Filed: Nov. 8, 1976

[30] Foreign Application Priority Data

Nov. 18, 1975 [DE] Fed. Rep. of Germany ....... 2551799

[51] Int. Cl.² .................. G03B 27/76; G03B 27/78
[52] U.S. Cl. .................. 355/35; 355/77; 355/68; 355/83; 355/38
[58] Field of Search ............. 355/68, 77, 69, 35–38, 355/67, 71, 83, 88

[56] References Cited

U.S. PATENT DOCUMENTS

| | | | |
|---|---|---|---|
| 3,152,897 | 10/1964 | Huboi et al. | 355/35 |
| 3,768,903 | 10/1973 | Steinberger | 355/38 |
| 3,829,214 | 8/1974 | Zahn et al. | 355/38 X |
| 3,947,110 | 3/1976 | Yamada | 355/38 |
| 3,963,344 | 6/1976 | Hujer et al. | 355/35 |

*Primary Examiner*—L. T. Hix
*Assistant Examiner*—W. J. Brady
*Attorney, Agent, or Firm*—Peter K. Kontler

[57] ABSTRACT

An automatic prereader for exposed and developed frames of a web of spliced-together photographic color films is preceded by a first station and followed by a second station at the first of which groups of successive frames are subjected to a first subjective examination by an attendant and at the second of which some of the frames are subjected to renewed subjective examination by the same attendant. The attendant actuates one or more pushbuttons upon examination of frames at the first station to produce signals which denote improperly oriented frames, frames which were exposed in artificial light and/or frames which are unfit for copying. Such signals are used to modify signals which are furnished by the automatic prereader. The modified and unmodified signals which are furnished by the prereader are examined for intensity, and those signals whose intensity is outside of a preselected range are displayed at the second station so that the attendant can observe such signals simultaneously with observation of the respective film frames and is in a position to initiate the generation of additional signals which are used to modify or erase the corresponding signals from the prereader before the signals are transmitted to the exposure controls of a copying machine.

23 Claims, 1 Drawing Figure

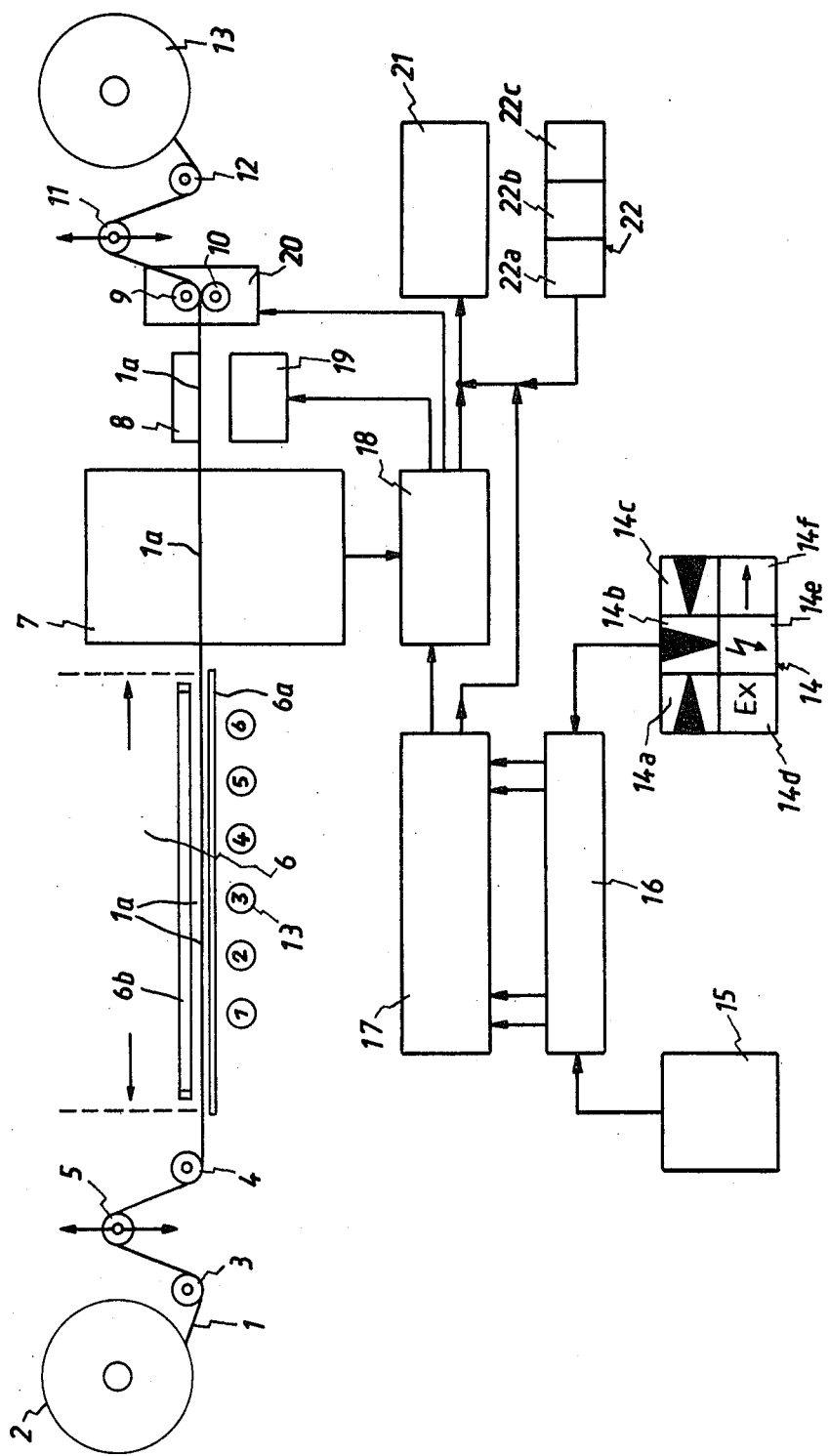

METHOD AND APPARATUS FOR EVALUATING DEVELOPED PHOTOGRAPHIC FILMS PREPARATORY TO REPRODUCTION

BACKGROUND OF THE INVENTION

The present invention relates to improvements in a method and apparatus for evaluating discrete portions of information on web-like carriers of information, especially for evaluating successive film frames on a web of spliced-together exposed and developed photographic color films prior to reproduction of the images of film frames in a copying machine. More particularly, the invention relates to a method and apparatus for producing density, color correction and/or other signals for transmission to the exposure controls of a copying machine in order to insure proper adjustment of exposure controls during reproduction of the respective film frames.

In accordance with a presently known procedure, an attendant examines successive frames of a web of photographic color films in order to detect those frames whose copying must be carried out with special adjustment of exposure controls in the copying machine. In the absence of any special adjustment, the exposure controls will cause the copying machine to make prints with an average density and with a tonal distribution which results in neutral grey on integral measurement of the entire film frame. In most instances, such method of examining and reproducing color film frames results in the making of acceptable color prints. However, the prints are unsatisfactory if the density distribution is not uniform or nearly uniform in all portions of a film frame and/or when a primary color dominates, e.g., because the photographer selected for exposure a scene the major part of which is blue, green or red. Automatic determination of the setting of exposure controls for reproduction of such film frames would entail undesirable suppression of dominant color and/or undesirable density of the most important part of the print.

It is further known to subject successive film frames to an automatic objective evaluation. As disclosed, for example, in commonly owned U.S. Pat. No. 3,523,728 to R. Wick et al., each frame can be subdivided into three imaginary sections or fields including a first field which coincides with the foreground of the photographed scene, a second field which coincides with the background of the scene, and a third field which coincides with the center of the scene and normally constitutes the most important part of the scene. The automatic evaluating system examines the three fields independently of each other and normally or often suppresses correction signals which are produced on examination of the first two fields in order to insure proper reproduction of the third field, i.e., of the most important part of the photographed scene. As a rule, the first field is in the lower part of the frame, the second field is in the upper part of the frame and the third field is in the middle of the frame. The just discussed breakdown of film frames into three fields is especially satisfactory for proper selection of adjustment of exposure controls to insure an optimum density of the prints.

A presently known determination of color correction factors is carried out primarily with a view to discriminate between film frames wth a dominant color and film frames with an undesirable color shade. Such determination normally involves a statistical evaluation of color ratios, i.e., the frame is scanned point-by-point and each point wherein a color prevails is classified as belonging to a dominant color. Such points are not considered in selection of exposure times for the particular color. In accordance with another presently known method, one determines the color ratio in a large number of frames forming part of a film; this allows for selection of appropriate adjustment of exposure controls to eliminate an undesirable color shade. Of course, such mode of examining film frames for the purpose of proper exposure in three colors does not take into consideration the possibility that a large number of film frames might carry the image of one and the same scene; in such instances, the presently known procedure of discriminating between the presence of a dominant color and a color shade is evidently ineffective.

Additional problems are encountered when the frames of a color photographic film include one or more frames with a density distribution which is basically different from the density distribution in an average film frame. Examples of such film frames are those which are exposed with flash; such frames invariably exhibit a poorly illuminated background which surrounds a strongly illuminated central field normally representing the images of a group of persons and being by far the most important part of the image. When making a print of such frame, the exposure controls of the copying machine must be properly adjusted to avoid an underexposure of the important field.

Further problems in connection with proper evaluation of film frames prior to copying will arise due to orientation of images on the frames. Thus, when an automatic prereader is set for separate scanning of the foreground, the background and the central field of a film frame, the prereader cannot determine whether or not the frame was exposed with the camera held at right angles to the normal position or upside down. A photographer is less likely to change the orientation of his or her camera when the film contains square frames. However, the likelihood that the photographer will tilt the camera, or even hold the camera upside down, is much more pronounced when the film consists of rectangular frames. As mentioned above, an automatic prereader cannot discriminate between a rectangular frame which bears a properly oriented image and a rectangular frame whereon the image is inclined through 90° or 180° with respect to the anticipated normal orientation of images. Therefore, correction signals which are produced by an automatic prereader upon evaluation of frames having improperly oriented images (whereby the term "improperly" denotes images whose orientation is different from anticipated orientation) will be unsatisfactory and the corresponding film frame will have to be reprinted in order to avoid customer complaints. A prereader which can compensate for improper orientation of images on film frames is disclosed in the commonly owned copending application Ser. No. 739,548 of Betzold et al. filed Nov. 8, 1976 now U.S. Pat. No. 4,080,066.

OBJECTS AND SUMMARY OF THE INVENTION

An object of the invention is to provide a novel and improved method of rapidly and reliably evaluating each and every discrete portion of information on an elongated web-like carrier, such as the frames of a web of spliced-together photographic color films, prior to copying of discrete portions of information in a copying machine so that the number of unsatisfactory reproductions is reduced to a minimum, preferably to zero.

Another object of the invention is to provide a method which allows for objective as well as subjective evaluation or examination of succesive and/or selected portions of information on a web-like carrier with a degree of accuracy and reliability which is unmatched by presently known methods.

A further object of the invention is to provide a novel and improved apparatus for the practice of the above outlined method and to construct and assemble the apparatus with a view to insure that it can furnish information whch is indicative of each and every important characteristic of each discrete portion of information, such as the density of film frames, tonal distribution of color film frames, the orientation of images on square or rectangular film frames, the presence of frames which were exposed with artificial illumination of a subject or scene and/or film frames which are totally unfit for copying.

An ancillary object of the invention is to provide an apparatus which combines the advantages of objective and subjective evaluation of discrete portions of information on a web-like carrier in a novel and improved way.

One feature of the invention resides in the provision of a method of processing discrete portions of information on a weblike carrier, particularly of processing discrete frames of an exposed and developed photographic color film or of a series of spliced-together color films, prior to reproduction of such information in a copying machine having adjustable exposure control means. The method comprises the steps of subjecting each and every portion of information first to a subjective examination which enables the person performing the subjective examination to produce or to initiate the generation of at least one first signal when the making of reproduction of a portion of information necessitates an adjustment of exposure control means in the copying machine (the portion or portions which are subjected to examination by such person are preferably illuminated in a first portion of a path along which the carrier is transported from a supply reel to takeup reel), thereupon subjecting each and every portion of information to an objective evaluation (e.g., by passing such portions of information through an automatic prereader which is adjacent to a second portion of the aforementioned path) and producing second signals for adjustment of exposure control means based on the objective evaluation, and utilizing the first signals to modify the corresponding second signals prior to transmission of second signals to the exposure control means. The modifying step can be carried out by resorting to a suitable processing circuit which receives first signals as well as signals which are produced by the automatic prereader.

If the portions of information are color film frames, at least the step of objective evaluation includes producing color and/or density correction signals for proper exposure of the corresponding film frames.

It is possible to subjectively examine one portion of information at a time; however, it is presently preferred to simultaneously examine a series of several (e.g., six) successive portions of information because a skilled attendant is capable of rapidly examining an entire series of portions of information (such as color film frames) to detect those portions which were exposed in artificial light, which are unfit for reproduction and/or whose orientation deviates from normal or anticipated orientation so that the automatic is prereader must be adjusted (or the signals furnished by the prereader modified) when an improperly oriented portion of information undergoes objective evaluation.

If the person in charge simultaneously examines several portions of information, the first signals are preferably produced in the same order in which the portions of information are arranged in the first portion of the aforementioned path (this can be readily achieved by using a selecting unit which can connect the means for producing first signals with selected stages of a signal storing circuit serving to store and transmit first signals to the means for modifying the second signals as a function of the intensity and/or another characteristic of the correspnding first signals.

The method preferably further comprises the steps of displaying at least some of the modified second signals, subjecting those portions of information to which the displayed second signals pertain to a second subjective examination which enables the person performing the second subjective examination to determine the accuracy of displayed modified second signals and to produce third signals when the displayed second signals require modification (including cancellation), and utilizing the third signals to modify the corresponding second signals prior to transmission of second signals to the exposure control means. It is presently preferred to compare the modified and unmodified second signals with a predetermined range of signals and to display only those second signals which are outside of such range. The second signals can be displayed in the form of alphanumeric values or in qualitative form (e.g., plus-minus symbols, different combinations of identical or differently colored light signals and/or others).

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWING

The single FIGURE is a diagrammatic view of an apparatus which includes an automatic prereader and wherein each and every portion of information on a web-like carrier is subjected to subjective examination prior to objective evaluation and at least some portions of information are further subjected to a second subjective examination.

DESCRIPTION OF THE PREFERRED EMBODIMENTS

A web 1 of exposed and developed photographic color film is transported from a supply reel 2 to a takeup reel 13. Successive frames 1a of the web advance along a first set of guide rolls including two stationary idler rolls 3, 4 and an mobile tensioning roll or loop former 5, thereupon an inspecting station 6 where a group of six successive frames 1a is subjected to subjective examination by an attendant, thereupon through an objective evaluating circuit 7 which produces density and/or color correction signals for proper exposure of certain frames 1a, thereupon through a second inspecting station 8, through the nip of two advancing or transporting rolls 9, 10 at least one of which is driven by a prime mover 20, around a further mobile tensioning roll or loop former 11 and finally around a stationary idler roll 12. One marginal portion of the web 1 is formed with suitable markers (e.g., notches or perforations, not shown) which are scanned by a conventional monitoring device serving to insure that each frame 1a is placed into accurate register with the copying station of a copying machine (not shown) when the reel 13 is transferred into the copying machine for the making of prints of some or all film frames. Reference may be had to commonly owned copending application Ser. No. 729,693 of Stein et al. filed Oct. 5, 1976, now U.S. Pat. No. 4,080,061 which discloses the monitoring device. Another monitoring device is preferably provided to insure that each film frame 1a is properly positioned in or relative to the objective evaluating circuit 7. The supply reel 2 preferably cooperates with a brake which insures that the web 1 is tensioned intrmediate the supply reel and the transporting rolls 9, 10.

The objective evaluating circuit 7 is preferably identical with a similar circuit of a conventional prereader which is used in photographic processing laboratories to furnish correction signals for proper reproduction of film frames in a copying machine. Signals which are produced by the evaluating circuit 7 are transmitted to a data carrier (e.g., a magnetic tape, a perforated tape or a magentic disk) which stores such information for decoding by a suitable reader of the copying machine to insure that the exposure controls of the copying machine receive pertinent information simultaneously with arrival of the corresponding film frames at the copying station. The apparatus which is shown in the drawing also comprises a data carrier (shown at 21).

The illustrated apparatus constitutes a discrete unit wherein successive and/or selected film frames are subjected to objective and subjective evaluation or examination independently of the copying machine. However, it is equally possible to integrate the inproved apparatus into a copying machine; this simplifies the construction of the apparatus because color and/or density correction signals can be transmitted directly to the exposure controls of the copying machine. The second inspecting station 8 then constitutes the copying station of the copying machine. Reference may be had to our commonly owned copending application Ser. No. 740,033 filed Nov. 8, 1976.

The six film frames 1a at the first inspecting station 6 are observable by the attendant through a ground glass plate 6a located in front of one or more light sources 6b, e.g., one or more elongated rod-like fluorescent lamps. Indicating markers 13 (with numerals "1" to "6") are provided at the inspecting station 6 so as to facilitate rapid identification of each of a group of six film frames 1a. An attendant which is stationed (preferably seated) at or close to the inspecting station 6 can actuate any one of six signal generating elements 14a to 14f on a control panel or keyboard 14 which is within reach of the attendant's hand. Each signal generating element may constitute a depressible pushbutton. The pushbuttons 14a, 14b, 14c of the upper row are provided with symbols which are indicative of different orientations of frames 1a, i.e., of those orientations which deviate from a normal or expected orientation. The depression of pushbutton 14d results in the generation of a signal which identifies a film frame 1a that is unfit for copying, the depression of pushbutton 14e results in the generation of a signal which is indicative of an exposure made with flash or another source of artificial light, and the pushbutton 14f is depressed when the attendant wishes to start the prime mover 20 so as to advance a fresh group of six film frames 1a into the inspecting station 6.

The apparatus further comprises a selecting unit 15 which is provided with several keys (not specifically shown), one for each film frame 1a at the inspecting station 6. Prior to actuating one of the pushbuttons 14a to 14e, the attendant actuates one of the keys in the selecting unit 15 to insure proper association of signals furnished by the pushbuttons 14a–14e with the corresponding film frame at the station 6. Signals which are generated by the pushbuttons 14a–14f and the keys of the selecting unit 15 are transmitted to a signal storing circuit 17 by way of a multiplexer 16. The components 14, 15, 16 and 17 of the improved apparatus may be constructed, assembled and operated in a manner as disclosed in the aforementioned copending application Ser. No. 729,693 now U.S. Pat. No. 4,080,061 of Stein et al.

One output of the signal storing circuit 17 is connected with a signal processing or modifying circit 18 which is further connected with the output of the objective evaluating circuit 7. As mentioned above, the circuit 7 furnishes density and/or color correction signals which must be transmitted to the exposure controls of the copying machine for proper reproduction of the respective film frames. One of three outputs of the processing circuit 18 is connected with a signal displaying unit 19 which enables the attendant to examine correction data for that film frame which is located at the second inspecting station 8. Another output of the circuit 18 is connected with the input of the prime mover 20, and a third output of the circuit 18 is connected to the aforementioned data carrier 21 (e.g., a magnetic disk or tape). A second control panel 22 has three signal generating elements 22a, 22b, 22c (e.g., pusbbuttons) the first of which is actuated when the attendant approves modified correction signals for reproduction of the film frame at the second station 8, the second of which is actuated when the attendant decides to erase or cancel the correction signals for reproduction of the film frame at the station 8, and the third of which is actuated when the attendant decides to modify a correction signal for reproduction of the frame at the station 6 (preferably to change the color correction signal on detection of a film frame with a dominant color). The film frames come to a standstill at the second inspecting station 8 in response to detection of the aforementioned markers in the web 1. The web 1 is provided with one marker for each film frame 1a. The means for monitoring such markers is operatively connected with the prime mover 20.

The operation:

The leader of the web 1 is preferably connected with a strip, not shown, which enables the attendant to thread the leader through the apparatus so that the first or foremost six frames 1a are in register with the corresponding indicating markers 13 at the first inspecting station 6. The light source 6b is on so that the attendant can examine all six film frames 1a at a glance in order to detect that film frame or those film frames which are unfit for reproduction. On detection of an unsatisfactory film frame 1a, the attendant depresses the corresponding key of the selecting unit 15 and the pushbutton 14d of the control panel 14. At the same time, the attendant examines the six film frames 1a at the inspecting station 6 for the presence of one or more film frames whose orientation deviates from normal. The normal orientation is that when the image is seen in upright position. If the image is turned through 90 degrees to the left or to the right, the attendant actuates the corresponding key of the selecting unit 15 and then depresses the pushbutton 14a or 14c. If the image is upside down, the attendant actuates the corresponding key of the selecting unit 15 and depresses the pushbutton 14b. The signals which are generated by pushbuttons 14a–14d are transmitted to corresponding stages of the signals storing circuit 17 by way of the multiplexer 16. Such signals are utilized in the processing circuit 18 for modification of corresponding signals transmitted by the objective evaluating circuit 7.

If the attendant has decided to depress the pushbutton 14d, the processing circuit 18 need not accept any signals from the circuit 7 when the latter evaluates the corresponding film frame 1a because such frame is not reproduced when it arrives at the copying station. The attendant also inspects the frames 1a at the station 6 for the presence of one or more frames which were exposed with flash, and the attendant then actuates the corresonding key of the selecting unit 15 as well as the pushbutton 14e.

When the inspection of all six frames at the station 6 and the transmission of appropriate signals to the circuit 17 is completed, the attendant depresses the pushbutton 14f whereby the prime mover 20 begins to advance the frames 1a from the inspecting station 6 into register with the objective evaluating circuit 7 and thereupon into register with the second inspecting station 8. The circuit 7 evaluates each frame in the customary way and transmits appropriate signals to the processing circit 18. The latter transmits a signal or a group of signals to the displaying unit 19 when the corresponding frame 1a reaches the second inspecting station 8. The signals which are displayed at 19 are indicative of correction signals furnished by the evaluating circuit 7 and modified, if necessary by signals transmitted by the pushbuttons 14a–14e on the control panel 14.

Instead of transmitting correction signals directly to the data carrier 21, the processing circuit 18 delays such transmission until after the completion of second subjective examination at the inspecting station 8. This enables the attendant to examine successive frames 1a by simultaneously observing the correction signals which are displayed at 19. If the attendant decides that the correction signals are satisfactory, he or she actuates the pushbutton 22a which results in the transmission of corresponding (satisfactory) signal or signals from the processing circuit 18 to the data carrier 21. If the correction signals are not acceptable, the attendant actuates the pushbutton 22b to prevent the transmission of corresponding correction signals to the data carrier 21 (this means that the corresponding film frame 1a will be reproduced in the same way as the majority of film frames, i.e., without any special adjustment of exposure controls in the copying machine). If the attendant determines that the film frame 1a at the inspecting station 8 exhibits a dominant color (e.g., blue because the image on the respective film frame represents a scene wherein the blue color of the sky dominates over red and green colors), the attendant actuates the pushbutton 22c to thereby modify the color correction signal which has been produced by the evaluating circuit 7. As mentioned above, the improved apparatus can be integrated into a copying machine; the lowermost input of the processing circuit 18 then transmits signals directly to the exposure controls of the copying machine because the inspecting station 8 coincides with the copying station. The manner in which successive or certain film frames can be subjected to visual examination at the copying station of a copying machine (by simultaneously preventing the light from impinging on a sheet of photographic paper or other copying material) is disclosed in our commonly owned copending application Ser. No. 740,033.

In order to reduce the time which is needed for subjective examination of film frames 1a at the inspecting station 8, the processing circuit 18 is preferably provided with means (e.g., suitable threshold circuits, not shown) which compares the correction signals with a predetermined range of signals and which causes the unit 19 to display a correction signal only when the intensity of such signal is outside of a predetermined range of signals (namely, outside of that range of signals which can be produced by the evaluating circuit 7 with a higher degree of accuracy than upon visual inspection of the respective film frames). When the intensity of a correction signal is outside of the aforementioned range, the circuit 18 causes the unit 19 to display the correction signal and the prime mover 20 to arrest the web 1 for a fixed interval of time (e.g., one second) which is long enough to enable the attendant to examine the film frame at the station 8 and to depress one of the pushbuttons 22a–22c prior to elapse of the selected interval. The unit 19 can display the correction signals in qualitative form (e.g., plus-minus symbols), in the form of alphanumeric values, in the form of combinations of several light signals or in the form of differently colored light signals.

The provision of second inspecting station 8 is desirable and advantageous because, though the objective evaluating circuit 7 is normally reliable in nine out of ten cases, it is not reliable when the density and/or tonal distribution of a frame 1a deviates considerably from an average density and/or tonal distribution. For example, the circuit 7 is unable to discriminate between film frames wherein one of the primary colors dominates and film frames with an unsatisfactory color shade. The appearance of correction signals on the screen of the displaying unit 19, simultaneously with prolonged stoppage of the corresponding film frame 1a at the second inspecting station 8, alerts the attendant that such film frame requires a subjective examination by simultaneously inspecting the displayed correction signals. As mentioned above, the attendant then actuates the pushbutton 22a, 22b or 22c in order to insure that the corresponding correction signals are transmitted to the data carrier 21 in unmodified form, in modified form or cancelled (which is tantamount to radical modification).

It has been found that the improved apparatus allows for surprisingly rapid objective and subjective examination of film frames 1a on an elongated web 1 (which normally consists of several color photographic films spliced together end-to-end). This is due to the fact that a skilled attendant is capable of simultaneously examining a substantial number of film frames at the first inspecting station 6. For example, a group of six successive frames 1a can be examined at a glance. In many instances, the attendant finds that there is nothing special about the frames at the inspecting station 6 (i.e., that the images of such frames are in normal orientation, that the frames were not exposed with flash and that all of the frames are fit for reproduction). The attendant then simply depresses the pushbutton 14f whereby the prime mover 20 begins to transport the web 1 lengthwise and to place successive subjectively examined frames 1a into register first with the objective evaluating circuit 7 and thereupon into register with the second inspecting station 8. The unit 19 preferably displays correction signals furnished by the objective evaluating circuit 7 only if the intensity of such signals deviates from a predetermined range (this is determined by the processing circuit 18), and the corresponding frames 1a are thereupon caused to dwell at the inspecting station 8 for a period of time which is long enough to enable the attendant to complete a second subjective examination and to actuate one of the pushbuttons 22a, 22b, 22c in order to allow for transfer of corresponding signals (which are modified or remain unchanged) to the data carrier 21. A skilled attendant can examine successive film frames 1a of a group of six frames during entry of such frames into the inspecting station 6 so that (if necessary) the attendant is ready to actuate the corresponding keys of the selecting unit 15 and one or more of the keys 14a–14e as soon as the prime mover 20 arrests the web 1 upon completed entry of six film frames into the inspecting station 6. The attendant thereupon watches the inspecting station 8 and the displaying unit 19 while the prime mover 20 advances the web 1 to place the next six frames 1a into register with the second inspecting station 8. Actually, the inspecting station 8 and displaying unit 19 need not be watched when the prime mover 20 is on, i.e., the attendant can examine the frames 1a which are advanced into the first inspecting station 6, because the appearance of properly illuminated correction signals in the displaying unit 19 constitutes a sufficient warning to direct attention to the second inspecting station 8 and unit 19. The frames which are in the process of entering the first inspecting station 6 cannot "escape" a subjective examination because such frames are transported away from the station 6 only when the attendant depresses the pushbutton 14f, i.e., it is up to the attendant to decide how long a group of six frames 1a will dwell at the first inspecting station. The subjective examination and objective evaluation of film frames can be carried out with the same degree of reliability when the apparatus is a discrete prereader or a prereader which is integrated into the copying machine.

The improved apparatus is susceptible of many further modifications without departing from the spirit of the invention. For example, the apparatus can be simplified by reducing the length of the inspecting station 6 so that the latter can accommodate only one frame 1a at a time. This eliminates the need for the selecting unit 15 and multiplexer 16 and renders it possible to utilize a much simpler signal storing circuit 17. However, such simplification of the apparatus entails a reduction of the output (i.e., of the number of film frames which are subjected to objective and subjective examination per unit of time).

An important advantage of the improved method and apparatus is that the objective evaluating elements of the apparatus can be simplified because the nature and/or intensity of correction signals for all those frames whose characteristics deviate considerably from average characteristics is determined by an attendant. Moreover, the task of selecting appropriate correction signals is divided between the attendant and an automatic objective evaluating system in the optimum way, i.e., the evaluating system produces correction signals in connection with the film frames which are more susceptible of automatic evaluation, and the attendant produces or modifies signals in each and every instance when the operation of the automatic evaluating system is not sufficiently reliable or is totally unreliable. In other words, the objective evaluating system complements the attendant and vice versa to thus insure that the number of unsatisfactory reproductions is reduced to a minimum or to zero. This is desirable and advantageous for obvious reasons, i.e., not only because the making of second prints involves additional expenditures in time, energy and photographic copy paper but also because the number of customer complaints (if any) is a minute fraction of the number of customer complaints when the film frames are reproduced in accordance with conventional techniques.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. A method of processing discrete portions of information on a web-like carrier, particularly discrete frames of an exposed and developed photographic film, prior to reproduction of such information in a copying machine having adjustable exposure control means, comprising the steps of subjecting said portions of information first to a subjective examination to thus enable the person performing such subjective examination to produce at least one first signal when the reproduction of a portion of information necessitates an adjustment of the exposure control means, said first signals including signals denoting the orientation of said portions of information on said carrier; thereupon subjecting the portions of information to an objective evaluation and producing second signals for adjustment of exposure control means based on said objective evaluation; and utilizing said first signals to modify the corresponding second signals prior to transmission of second signals to the exposure control means.

2. A method as defined in claim 1, wherein said portions of information are frames of an exposed and developed photographic color film and at least said step of objective evaluation includes producing color and/or density correction signals for reproduction of at least some film frames.

3. A method as defined in claim 1, wherein said step of subjective examination includes illuminating at least one portion of information at a time.

4. A method as defined in claim 1, wherein said step of subjective examination includes simultaneously examining a plurality of successive portions of information.

5. A method as defined in claim 4, wherein said step of subjective examination further includes producing said first signals in the same sequence as the sequence of portions in each of said pluralities of portions.

6. A method as defined in claim 5, further comprising the step of transporting successive pluralities of portions of information into a predetermined position for subjective examination.

7. A method as defined in claim 1, wherein said first signals include signals denoting the lack of fitness of said portions of information for reproduction.

8. A method as defined in claim 1, wherein said portions of information are film frames and said first signals include signals denoting those film frames which were exposed with artificial illumination of the subject or scene.

9. A method of processing discrete portions of information on a web-like carrier, particularly discrete frames of an exposed and developed photographic film, prior to reproduction of such information in a copying machine having adjustable exposure control means, comprising the steps of subjecting said portions of information first to a subjective examination to thus enable the person performing such subjective examination to produce at least one first signal when the reproduction of a portion of information necessitates an adjustment of the exposure control means; thereupon subjecting the portions of information to an objective evaluation and producing second signals for adjustment of exposure control means based on said objective evaluation; utilizing said first signals to modify the corresponding second signals prior to transmission of second signals to the exposure control means; displaying at least some of said second signals; subjecting the portions of information to which the displayed second signals pertain to a second subjective examination to thus enable the person performing said second subjective examination to determine the accuracy of the displayed second signals and to produce third signals when the displayed second signals require modification; and utilizing said third signals to modify the corresponding second signals prior to transmission of second signals to the exposure control means.

10. A method as defined in claim 9, further comprising the step of comparing said second signals with a predetermined range of signals, said displaying step including exhibiting for visual observation only those second signals which are outside of said predetermined range.

11. A method as defined in claim 9, wherein said displaying step includes exhibiting said second signals for visual observation in the form of alphanumeric values.

12. A method as defined in claim 9, wherein said displaying steps comprises exhibiting said second signals for visual observation in qualitative form.

13. Apparatus for processing discrete portions of information on a web-like carrier, particularly discrete frames of an exposed and developed photographic film, prior to reproduction of such information in a copying machine of the type having adjustable exposure control means, comprising manually actuatable means for producing first signals when a person performing a subjective examination of said portions determines that proper reproduction of selected portions of information necessitates an adjustment of the exposure control means, including means for producing signals which denote the orientation of said portions of information on said carrier; evaluating means for thereupon subjecting successive portions of information to an objective examination, including means for producing second signals for adjustment of exposure control means based on said objective examination; and means for modifying said second signals as a function of the corresponding first signals prior to transmission of said second signals to the exposure control means.

14. Apparatus as defined in claim 13, further comprising means for transporting successive portions of information along a predetermined path having a first portion wherein said portions of information are subjected to subjective examination and a second portion in the range of said evaluating means.

15. Apparatus as defined in claim 14, further comprising means for illuminating said portions of information in said first portion of said path.

16. Apparatus as defined in claim 14, wherein said first portion of said path has a length which is sufficient to accommodate a plurality of successive portions of information.

17. Apparatus as defined in claim 16, further comprising means for storing said first signals including a plurality of stages, one for each portion of information in said first portion of said path, and means for connecting said means for producing said first signals with selected stages of said signal storing means, said signal storing means being connected with said means for modifying said second signals.

18. Apparatus as defined in claim 14, wherein said portions of information are film frames and said means for producing said first signals includes means for producing signals denoting those film frames which were exposed with artificial illumination of a subject or scene.

19. Apparatus as defined in claim 19, further comprising data carrier means operatively connected with said modifying means and arranged to store said second signals in the form of encoded information.

20. Apparatus for processing discrete portions of information on a web-like carrier, particularly discrete frames of an exposed and developed photographic film, prior to reproduction of such information in a copying machine of the type having adjustable exposure control means, comprising manually actuatable means for producing first signals when a person performing a subjective examination of said portions determines that proper reproduction of selected portions of information necessitates an adjustment of the exposure control means; evaluating means for thereupon subjecting successive portions of information to an objective examination, including means for producing second signals for adjustment of exposure control means based on said objective examination; means for transporting successive portions of information along a predetermined path having a first portion wherein said portions of information are subjected to subjective examination and a second portion in the range of said evaluating means; means for modifying said second signals as a function of the corresponding first signals prior to transmission of said second signals to the exposure control means; means for displaying at least some of said second signals; and means for producing third signals for modification of displayed second signals based on a second subjective examination of corresponding portions of information in a third portion of said path downstream of said second portion.

21. Apparatus as defined in claim 20, wherein said modifying means includes means for comparing said second signals with a predetermined range of signals and for transmitting to said displaying means only those second signals which are outside of said range.

22. Apparatus as defined in claim 21, further comprising means for arresting said transporting means for a predetermined interval of time whenever said displaying means exhibits a second signal so as to enable the person performing said second subjective examination to observe the respective portion of information and the exhibited second signal.

23. Apparatus as defined in claim 20, wherein said third portion of said path constitutes the copying station of the copying machine.

* * * * *